United States Patent [19]

Bolssens et al.

[11] 4,361,941

[45] Dec. 7, 1982

[54] VALVE AND WIRE CUTTING, SKINNING AND WRAPPING TOOL EMPLOYING THE VALVE

[75] Inventors: Frans P. J. Bolssens, Heide Kalmthout; Guy C. J. L. G. G. M. Franck, Borsbeek; Henri Dehertefelt, Niel, all of Belgium

[73] Assignee: International Standard Electric Corporation, New York, N.Y.

[21] Appl. No.: 162,844

[22] Filed: Jun. 25, 1980

Related U.S. Application Data

[62] Division of Ser. No. 892,573, Apr. 3, 1978.

[30] Foreign Application Priority Data

Apr. 29, 1977 [NL] Netherlands ............... 7704709

[51] Int. Cl.³ .................................... H01R 43/04
[52] U.S. Cl. .................................... 29/33 M; 29/566.1; 29/753; 140/93 R; 140/124
[58] Field of Search ................... 29/33 F, 33 K, 33 M, 29/566.1, 566.3, 564.1, 564.6, 566.4, 56.6, 564.4, 751, 753, 759; 140/124, 93R; 81/9.5 A

[56] References Cited

U.S. PATENT DOCUMENTS 2,885,764 5/1959 Shultees et al. ............... 29/566.1
3,967,357 7/1976 Bolssens et al. ............... 29/566.4

Primary Examiner—Z. R. Bilinsky
Attorney, Agent, or Firm—John T. O'Halloran; Alfred C. Hill

[57] ABSTRACT

The wire cutting, skinning and wrapping tool includes a hollow sleeve, a knife carried by the sleeve, a bit provided with a longitudinal groove which is able to slide in a forward and backward direction in the sleeve, the bit and the knife skinning an insulated wire over a predetermined length and a means to move the bit from a backward to a forward position during the skinning operation. The sleeve is provided by normally closed sleeve halves with the insulated wire opening the sleeve halves during the skinning operation and with the sleeve halves closing again when the bit is in the forward position after each skinning operation. The length of skinned wire is captured between the bit groove and the closed sleeve halves.

5 Claims, 17 Drawing Figures

VALVE AND WIRE CUTTING, SKINNING AND WRAPPING TOOL EMPLOYING THE VALVE

CROSS-REFERENCE TO RELATED APPLICATION

This application is a division of application Ser. No. 892,573, filed Apr. 3, 1978.

BACKGROUND OF THE INVENTION

The present invention relates to a valve including an inlet port and two outlet ports and an arrangement to cause fluid pulses to appear at the outlet ports as a result of the appearance of fluid pulses at the inlet port.

Such a valve is known from the Belgian Pat. No. 737,162. In this valve the arrangement is constituted by electromagnets switching a valve member from one position to another, the valve member being able to connect one or the other outlet ports with the inlet port.

SUMMARY OF THE INVENTION

It is an object of the present invention to realize a valve which does not need such electromagnets and wherein the input fluid pulse itself switches the valve from one position to another.

A feature of the present invention is the provision of a valve comprising: a first inlet port; two first outlet ports; and an arrangement to cause fluid pulses to appear at the first outlet ports as a result of the appearance of the fluid pulses at the first inlet port; the fluid pulses fed to the first inlet port directly reappear at the first outlet ports and directly cause the valve to pass through at least three successive positions for every two of the fluid pulses at the first inlet port.

In this way a fluidic toggle switch is realized which can for instance switch the air pulses at the inlet port alternately to one of the other outlet ports as every pulse appears at the inlet port and without any additional, e.g. electrical control means.

Such additional electrical control means may increase the complexity, the price and also the volume of fluidic systems including such a valve. In some cases the latter drawback may be a very inconvenient one especially in those cases where the use of a miniaturized pneumatic system such as a pneumatic control system for instance is imperative.

It is a further characteristic of the present invention that the pneumatic control system is mounted in the handgrip of a wire cutting, skinning and wrapping tool.

In the U.S. Pat. No. 3,967,357 a wire cutting, skinning and wrapping tool is shown having an external pneumatic control system. This, however, limits the manageability of the tool since it is connected with the control system via obstructing conduits for pressurized air.

It is evident that when such a control system is mounted in the handgrip of the tool this system must be small and all the constituent parts such as valves have to be miniaturized and their number must be reduced as much as possible.

The present invention also relates to a wire cutting, skinning and wrapping tool able to perform two successive skinning and wrapping operations in order to interconnect two terminals with an insulated wire, the wire being skinned over a predetermined length by means of a bit which is provided with a longitudinal groove and which is able to slide in a forward and backward direction in a hollow sleeve, the bit moving from a backward position to a forward position during the skinning operation, the skinned wire portion being situated in the longitudinal groove during the two skinning operations.

Such a wire cutting, skinning and wrapping tool is known from the above mentioned U.S. Pat. No. 3,967,357. The four operations sequences needed to carry out the successive skinning and wrapping operations are summarized on pages 10 and 11 of the above patent. In short, when the trigger is pulled a first time an insulated wire is fed from the reel and skinned during the forward movement of the bit. The tool is positioned over the first terminal to be wrapped and when the trigger is pulled again a first wrapping operation is carried out and the bit slides backward into the sleeve, both this sleeve and bit rotating over an angle of 180°. The tool is now moved towards the second terminal to be wrapped and the trigger is pulled a third time. The insulated wire is cut and the free wire end is skinned during the forward movement of the bit. The tool is now positioned over the second terminal and when the trigger is pulled a last time the second wrapping operation is carried out whereafter the bit moves again backward, this bit and sleeve rotating over an angle of 180° so that the bit and sleeve are again in their starting position. During the first wrapping operation only the bit rotates while the sleeve is kept stationary. During the second wrapping operation however, both the bit and sleeve rotate. This is necessary since when the sleeve is kept fixed, the skinned wire would project into the sleeve slit during the rotation of the bit so that it would be impossible to carry out the second wrapping operation. To alternately keep the sleeve fixed and to rotate it, a complicated clutch mechanism is needed to uncouple the sleeve from the bit or to couple these two together during the first or the second wrapping operation, respectively. This increases the price of the tool.

Therefore, it is a further object of the invention to realize a cheaper tool.

The invention is also characterized in that the sleeve is provided with a normally closed longitudinal slit, the insulated wire opening the sleeve longitudinally and passing through the slit during the skinning operations and that the sleeve closes again when the bit is in its forward position after each skinning operation, the predetermined skinned wire length being captured in the groove between the bit and closed sleeve.

In this way, the sleeve can be kept stationary since during each wrapping operation it is closed, the insulated wire being located outside the sleeve during the wrapping operations.

In a preferred embodiment the pneumatic 3-way valve has three ports. A first one of these ports which is normally connected to a supply of pressurized air (not shown) may be alternately interconnected with either one of the two other ports by means of an internal control mechanism operated by the main input air flow. The first one of these ports is normally the input port while the two other ports are normally output ports. This control mechanism mainly includes a piston and a valve member. The piston consists of a rod provided with two end pieces which are frictionally mounted in the bore of a cylinder, the piston being able to move to and fro therein between two end positions. The valve member is slidably mounted on the piston rod between two like spiral springs each mounted over the piston rod between the valve member and the endpieces. The valve member is able to move in a free space between two seat positions thus connecting one or the other output port with the input port. In the rest position when the piston is in one of its end positions one spring is released while the other is compressed pushing the valve member against one of its two seat positions. The piston remains in its rest position since the friction force of the end pieces in the cylinder is larger than the repelling force of the compressed spring. When compressed air is supplied the valve member is maintained against its seat and the piston is pushed in its other end position compressing the released spring and releasing the other one. When the air pressure is cut and the air in the free space is exhausted the valve member is displaced towards its other seat position due to the action of the compressed spring.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
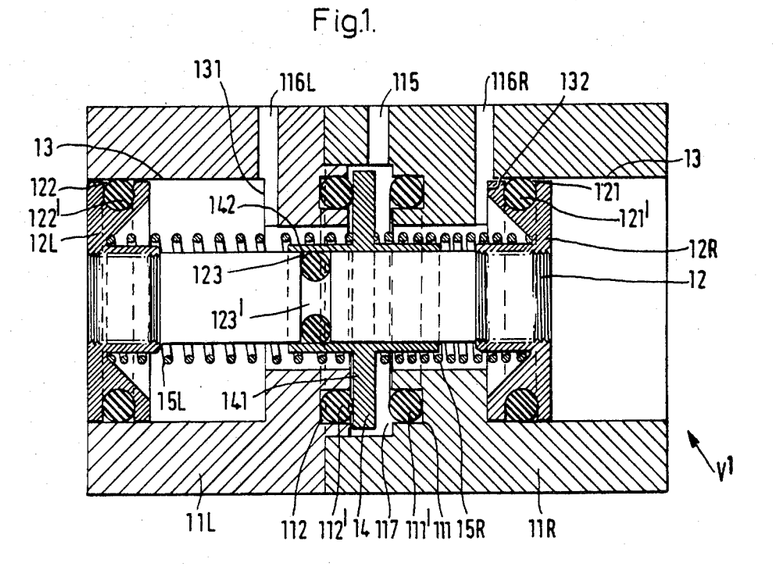
FIG. 1 is a pneumatic 3-way valve according to the principles of the present invention.

The pneumatic 3-way valve V1 shown in FIG. 1 mainly includes a housing made of two halves 11R and 11L, a piston rod 12 with end portions 12R, 12L and a valve member 14 having a flange 141 integral with a bush 142 which is slidably mounted on the piston rod 12 between two like spiral springs 15R and 15L. The half 11R is provided with an annular groove 111, for the sealing ring 111' and ports 115 and 116R, respectively, whereas the housing half 11L is provided with an annular groove 112, for the sealing ring 112' and a port 116L. Port 115 is the inlet port for pressurized air whereas ports 116R and 116L are connected to pneumatic devices (not shown) controlled by valve V1. The housing has bores 13 wherein the end portions 12R and 12L, which are rigidly secured to a piston rod 12, may move to and fro. These end portions 12R and 12L are provided with annular grooves 121 and 122 to locate the sealing rings 121' and 122', respectively.

The piston rod has a peripheral groove 123 for a sealing ring 123'. The movement of the above mentioned valve member 14 with flange 141 is however restricted since it is only able to move to and fro within the free space 117. When the flange abuts against sealing ring 112' pressurized air is able to flow from inlet 115 to port 116R. On the contrary, when the flange abuts against sealing ring 111' pressurized air is able to flow from port 115 to port 116L. In the position shown spring 15R is compressed while spring 15L is released. However, the piston is not able to move to the right since the spring force of the compressed spring 15R is smaller than the friction force due to the friction of the sealing rings 121' and 122' of the end portions 12R and 12L in the bores 13, respectively.

The pneumatic valve operates as follows. In the position drawn pressurized air which is supplied via port 115 can only flow via port 116R and moves the piston rod to the right until end portion 12L abuts against the rim 131. Due to this the spring 15L is compressed while spring 15R is released. Although the compressed spring 15L tends to displace the valve member 14 to the right the latter is maintained in its left position by the pressurized air. When the supply of pressurized air is cut off the air imprisoned in the free space 117 is exhausted via port 116R for instance. This port may therefore be provided with the necessary exhaust means (not shown) and when the pressurized air in the free space becomes smaller than a predetermined value unable to maintain the valve member 14 in the left position against the action of the spiral spring 15L the valve member 14 is moved to the right until it abuts against sealing ring 111'. When pressurized air is supplied again it now flows via port 116L and the piston rod 12 is moved in the opposite direction until the end portion 12R abuts against the rim 132. Due to this spring 15R is compressed again and spring 15L is released and as in the previous case the valve member is only able to move when the supply of pressurized air is cut off and the air imprisoned in the free space 117 is exhausted as explained above. When this occurs the valve is in its starting position.

From the above it follows that at a port 116R or 116L a pulse is connected every two pulses from a continuous pneumatic pulse train.

Figure 2:
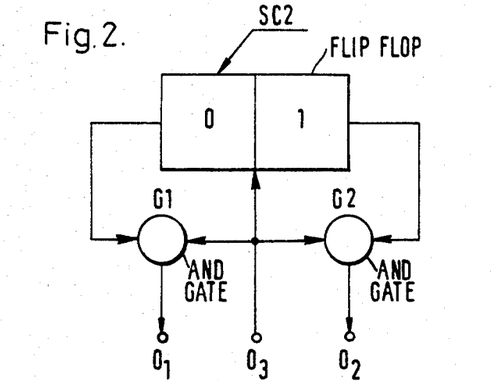
FIG. 2 is an electrical equivalent circuit of the valve shown in FIG. 1.
Figure 3:
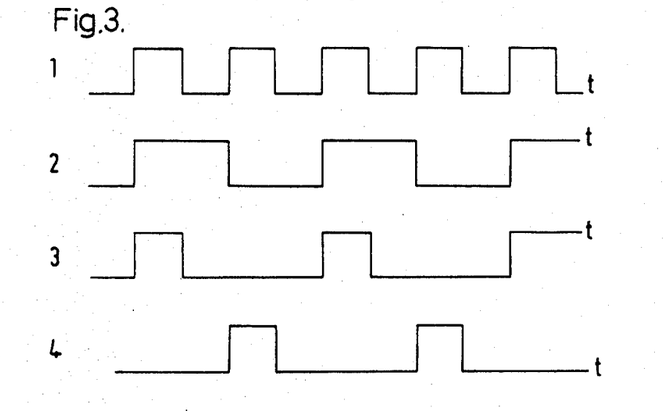
FIG. 3 are waveforms relative to the electrical equivalent circuit according to FIG. 2.

An electrically equivalent circuit is shown in FIG. 2. The 0- and 1-outputs of flip flop SC2 are connected to one of the inputs of AND-gates G1 and G2, respectively. The other inputs of the gates are both connected to an input terminal 03. The output terminals 01 and 02 of gates G1 and G2 are the outputs of the device respectively. The output waveform in function of time t collected to the 0-output of flip flop SC2 is shown in Curve 2, FIG. 4 when a waveform as shown in Curve 1 is applied to the input 03. The waveforms of Curves 3 and 4 are collected at the outputs 01 and 02, respectively.

It should be noted that flip flop SC2 and gates G1 and G2 need a continuous supply voltage. The valve described above does not need a continuous supply of pressurized air so that the electrical circuit is not entirely equivalent.

A number of three-way valves of the type described above can be combined together to form series and series-parallel combinations. The series combination schematically shown in FIG. 4 includes 3 three-way valves 1, 2 and 3. These valves each have a port 11, 21 and 31 and ports 12 and 13; ports 22 and 23; and ports 32 and 33 corresponding to ports 115 and 116R, 116L of valve V1 of FIG. 1, respectively. Ports 12 and 22 of valves 1 and 2 are connected with ports 21 and 31 of valves 2 and 3, respectively. It is supposed that in the rest condition ports 11, 21 and 31 give access to ports 13, 23 and 33, respectively. A series of pneumatic pulses is now supplied to port 11. The table on page 9 shows the input pulses and corresponding ports to which these pulses are transmitted. The arrows on a line preceding that of a given pulse indicate the outlet port (left 13; 23; 33) or right (12; 22; 32) of the valve to which the pulse is transmitted from its supply port (11; 21;31). A first pulse is transmitted to port 13 of valve 1. A second pulse is transmitted to port 23 of valve 2 via port 12 of valve 1 and port 21 of valve 2. A third pulse is again transmitted to port 13 of valve 1. A fourth pulse is transmitted to port 33 via ports 12, 21 and 22, 31 etc. It should be noted that at the port 13 an output pulse appears every two pulses of the series of pulses fed to the port 11, while at the ports 23, 33 and 32 an output pulse appears every four and every eight pulses, respectively.

TABLE

Figure 4:
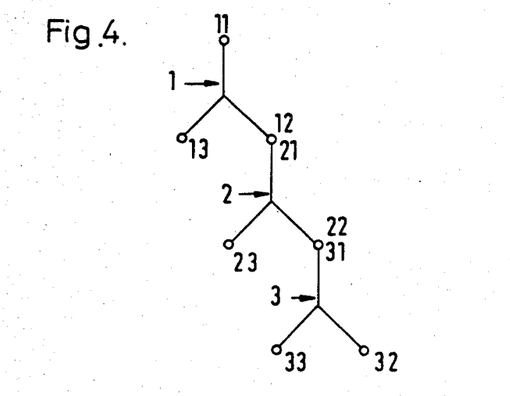
FIG. 4 is a schematic representation of a series combination of 3 three-way valves of FIG. 1.

| PULSE | OUTLET PORT | VALVE POSITION | | |
|---|---|---|---|---|
| | | 1 | 2 | 3 |
| Rest | — | ← | ← | ← |
| 1 | 13 | → | ← | ← |
| 2 | 23 | ← | → | ← |
| 3 | 13 | → | → | ← |
| 4 | 33 | ← | ← | → |
| 5 | 13 | → | ← | → |
| 6 | 23 | ← | → | → |
| 7 | 13 | → | → | → |
| 8 | 32 | ← | ← | ← |
| 9 | 13 | → | ← | ← |
| 10 | — | — | — | — |
| — | — | | | |
| — | — | | | |

Figure 5:
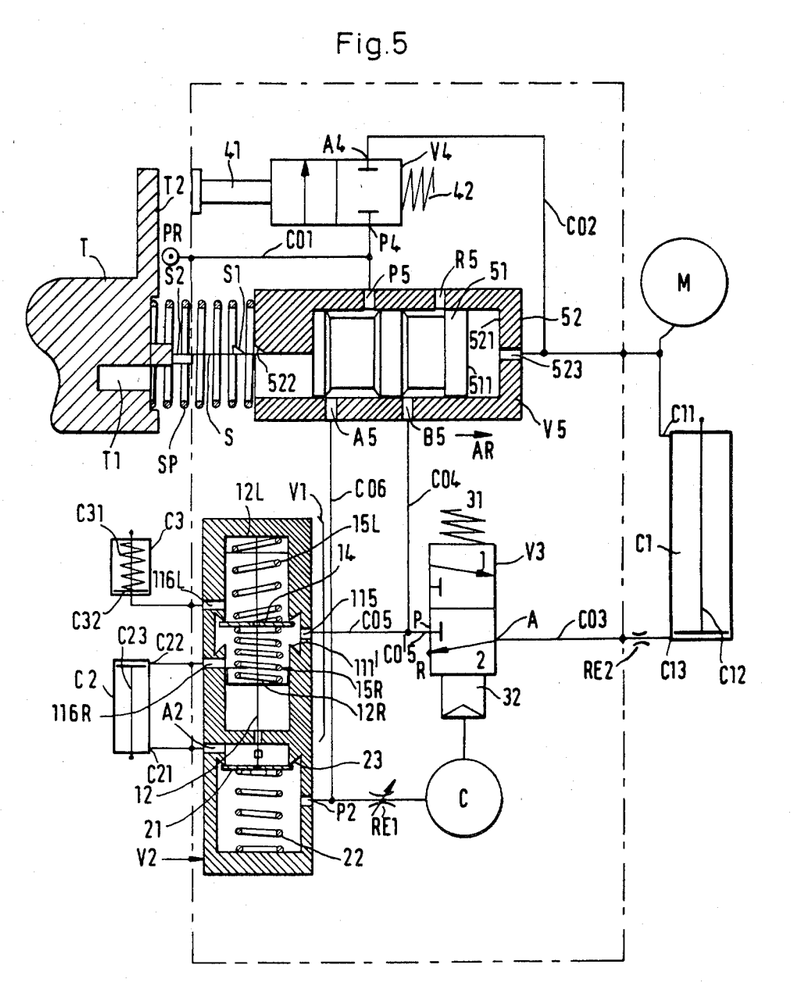
FIG. 5 is a schematic representation of a pneumatic control system shown in its rest position including the 3-way valve represented in FIG. 1.
Figure 6:
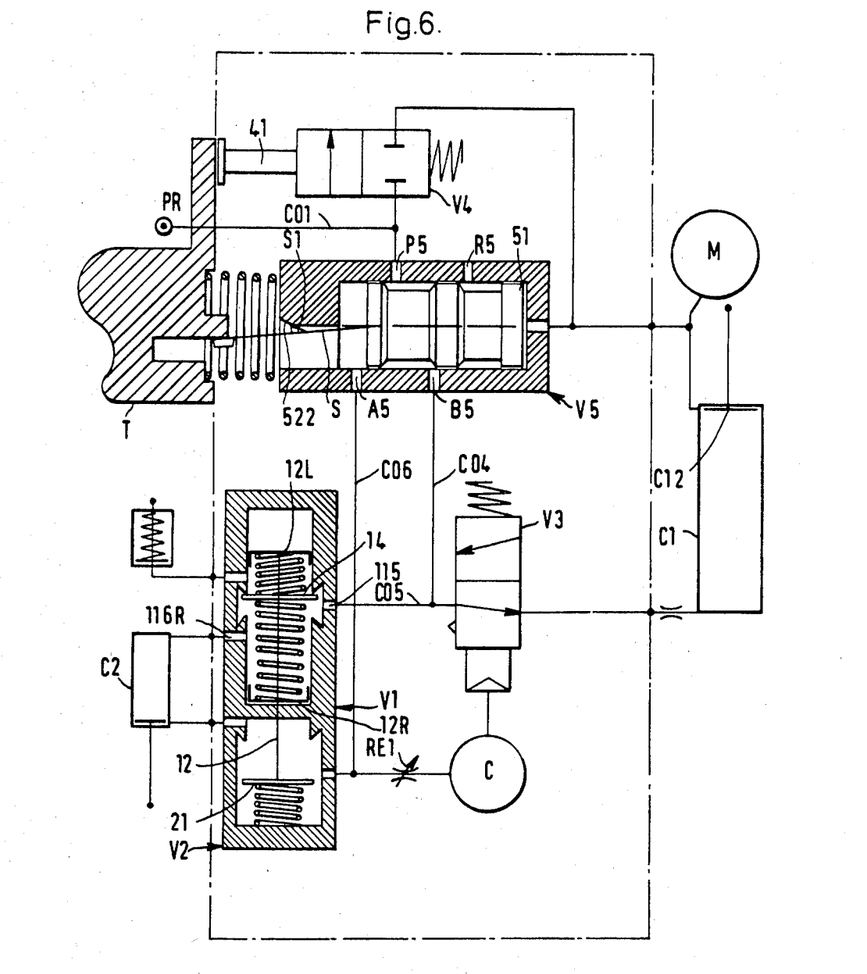
FIGS. 6 and 7 show operating positions of the pneumatic control system represented in FIG. 5.
Figure 7:
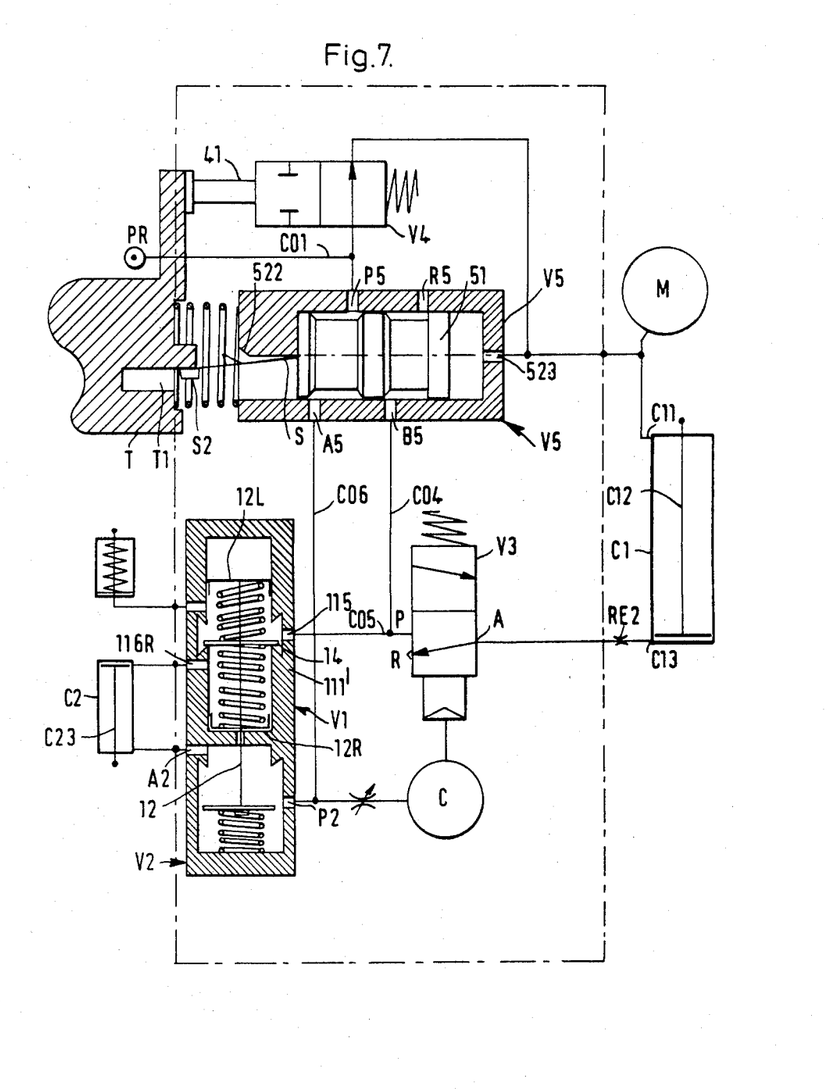

The above described valve forms part of a pneumatic control circuit schematically shown in FIGS. 5 to 7. This pneumatic control circuit is used to control the operations sequences of a wire cutting, skinning and wrapping tool which is similar to the one already referred to in the introductory part (U.S. Pat. No. 3,967,357) but which uses an external control circuit connecting the tool by means of obstructing conduits. The pneumatic control circuit which will be described hereinafter is mounted in the handgrip of the tool which is thus rendered very manageable. In the above figures the part of the control circuit mounted in the handgrip is shown in the rectangle drawn in dashed lines.

Principally referring to FIG. 5 the control circuit shown in its rest condition therein includes the valve V1 described above, a two-way valve V2 coupled to valve V1, a three-way valve V3, a two way valve V4 and a four-way valve V5 the piston 51 of which is displaceable in the direction of the arrow AR by means of trigger T coupled to the piston 51 via a blade spring S.

The trigger T has a return spring SP. The blade springs have a rectangular portion S2 and a triangular portion S1, the function of which will be explained later.

The two-way valve V4 has a pusher 41, two ports P4 and A4 and two switching positions. The valve V4 is drawn in its non-actuated condition, the return spring 42 being released. When the valve is actuated the inlet port P4 is connected to the outlet port A4 and the return spring is compressed.

The four-way valve V5 has four ports P5, R5, A5, B5 and an activating port 523 and two switching positions. In the rest condition ports P5 and A5 and ports R5 and B5 are interconnected while in the actuated condition when the right piston face 511 abuts against the right face 521 of valve cylinder 52, the ports P5 and B5 are interconnected and the port A5 communicates with the external atmosphere. The valve V5 is brought into the actuated condition by pulling trigger T in the direction of the arrow AR until it abuts against pusher 41 of valve V4. In this position the triangular portion S1 on the blade spring S abuts against the oblique edge 522 of the cylinder 52 so that this blade spring is bent and the square portion S2 faces the recess T1 of trigger T. When the trigger is further pulled in the direction of the arrow AR the valve V4 is actuated.

In the valve V1 schematically represented in this FIG. 5 the valve member 14, springs 15L, 15R, end portions 12L and 12R, piston rod 12, inlet port 115 and outlet ports 116R and 116L are recognized. Valve member 21 of the valve V2 is rigidly fixed to the piston rod 12 and is pressed against the seat 23 by means of spring 22. The valve V2 has two ports P2 and A2.

The three-way valve V3 has three ports P, R and A and two switching positions. This valve is shown actuated, the return spring 31 being compressed and the port A being connected to the exhaust port R. The valve V3 is actuated in the rest condition of the pneumatic control circuit since pressurized air is supplied from source PR to its actuating mechanism 32 via the ports P5 and A5 of valve V5, conduit CO6, restriction RE1 and air vessel C. Pressurized air is supplied to ports P4 and P5 via conduit CO1. Conduit CO6 also connects port A5 to port P2 of valve V2. Via conduit CO2 the port A4 is connected to the activating port 523 of valve V5, a wrapping motor M and a port C11 of a wire skinning cylinder C1 having another port C13 which is connected to the port A of valve V3 via restriction RE2 and conduit CO3. The piston C12 is shown in its retracted position. The port B5 of valve V5 is connected to port P of valve V3 and port 115 of valve V1 via collective conduit CO4 and conduits CO'5 and CO5, respectively. The port A2 of V2 is connected to the port C21 of wire feeding cylinder C2 having another port C22 connected to the port 116R of valve V1. The piston C23 is shown in its retracted position. The port 116L of valve V1 is connected to wire cutting cylinder C3 having the return spring C31 holding the piston C32 in its retracted position.

The wire wrapping motor M, wire skinning cylinder C1 and piston C12 correspond to the wire wrapping motor 04 rigidly connected to the bit 05, cylinder 10 and double acting piston 01 of the above mentioned U.S. patent, respectively. Similarly, the wire feeding cylinder C2 and piston C23 and the wire cutting cylinder C3 and piston C32 correspond to cylinder 220 and piston 200 of the wire feeding mechanism 20 and the wire cutting cylinder 266 and piston 265 of the wire cutting mechanism 25 of the above mentioned U.S. patent, respectively.

The operation of the control system will now be explained reference being hereby principally made to FIGS. 6 and 7 showing the positions corresponding to the first and second operation sequences of the control system, respectively. The positions corresponding to the third and fourth operations sequences are not shown since they can easily be derived from the previous ones.

In the rest condition pressurized air is fed to the vessel C via conduit CO1, ports P5 and A5 of valve V5, conduit CO6 and restriction RE1. Consequently, after a predetermined time interval the air vessel C is filled and the valve V3 is actuated.

1st Operation Sequences (FIG. 6)

The trigger T is pulled until it abuts against pusher 41 of valve V4. The operator then feels a resistance indicating that he has not to pull further. Since now piston 51 of valve V5 is in its actuated condition the following happens.

(1) Pressurized air is fed to the wire feeding cylinder C2 via conduit CO1, ports P5 and B5 of valve V5, conduits CO4, CO5 and ports 115 and 116R of valve V1 so that insulated wire is fed to the cutting, stripping and wrapping tool as explained in the above mentioned U.S. patent. At the same time the piston 12 with end portions 12R and 12L and valve member 21 of valve V2 move downward but valve member 14 of valve V1 is maintained in the position shown as explained earlier.

(2) The contents of vessel C is emptied via restriction RE1, conduit CO6 and port A5, so that after a predetermined time interval valve V3 returns to its rest position thus allowing pressurized air to pass to cylinder C1. Piston C12 now extends moving at the same time the wrapping bit which slides forward in the hollow sleeve of the wire skinning and wrapping tool thus skinning the insulated wire.

It should be noted that the blade spring S is bent due to the triangular portion S1 having abutted against the oblique edge 522.

2nd Operation Sequence (FIG. 7)

The trigger T is pulled in order to displace the pusher 41 of valve V4 which is actuated. It is possible to further pull this trigger T since as explained above the blade spring S being bent the square portion S2 faces the recess T1 of trigger T. Due to valve V4 being actuated the following happens:

(1) Pressurized air is supplied to the wrapping motor M, to the activating port 523 of valve V5 and to port C11 of the wire skinning cylinder C1. Consequently, the wire wrapping motor is activated, the piston 51 of valve V5 is displaced to the left so that it arrives again in its rest position. Although the valve V3 is in its non-actuated condition so that port A is connected to port P the piston C12 of the wire skinning cylinder will not have the time to move downward during the wire wrapping operation since on the one hand port C13 of cylinder C12 is connected to port A via the restriction RE2 releasing the air very slowly and on the other hand the wire wrapping operation only takes a few hundreds of a second. After a predetermined time interval the vessel C is filled. The valve V3 is then actuated so that the wire skinning cylinder is further emptied via port R.

(2) Due to the fact that piston 51 is in its rest position the air supply to valve V1 is interrupted. However, pressurized air is now supplied to the wire feeding cylinder C2 via conduit CO1, ports P5 and A5 of V5, conduit CO6, ports P2 and A2 of valve V2 moving piston C23 upward. The air in cylinder C2 is evacuated via ports 116R and 115 of valve V1, conduits CO5 and CO4 and ports B5 and R5 of valve V5 and finally when the piston C23 of cylinder C2 has pushed all air out valve member 14 moves downward to abut against seat 111' since as explained above, piston 12 with end portions 12R and 12L has moved downward.

3rd Operation Sequence

When the trigger is released it returns to its rest position due to the action of spring SP so that consequently also the blade spring S is again in its rest position. When the trigger is pulled a third time until it abuts against the pusher 41 of valve V4 piston 51 of valve V5 is displaced to the right. As a consequence thereof pressurized air is supplied to the wire cutting cylinder to cut the insulated wire and after a predetermined time interval valve V3 is restored to its non-activated position whereby pressurized air is supplied to the wire skinning cylinder C1 so that the 2nd skinning operation is carried out. At the same time when pressurized air is supplied to the wire cutting cylinder piston 12, end pieces 12L and 12R and valve member 21 (FIG. 6) of valve V2 are moved upwards, to prepare the next operation sequence.

4th Operation Sequence

The trigger T is pulled and as for the 2nd operation sequence the valve V4 is actuated so that the wrapping motor is activated, the piston 51 of valve V5 is moved to the left and the vessel C is filled with pressurized air. The wire skinning piston C12 which was in its upward position returns slowly to its rest position and since the air supply to valve V1 is cut off the wire cutting cylinder is exhausted via conduits CO5 and CO4 and ports B5 and R5 and the valve member 14 also returns to its rest position to prepare the next operations.

From the above it follows that the two way valve V1 alternately allows the wire feeding mechanism and the wire cutting mechanism to be operated during the successive operation sequences, the main air supply itself controlling the operations of the valve, i.e. no supplementary controlling air supply is necessary.

The wire cutting, skinning and wrapping tool described in the earlier mentioned U.S. patent includes a sleeve 07 with helical slit 070 with a protecting sleeve 08 (FIG. 2) and a clutch mechanism 15 (FIGS. 18 and 19) to decouple and couple the sleeve from and to the bit during the first and second wrapping operations, respectively. This mechanism and sleeves have been replaced by a simpler sleeve mechanism including two sleeve halves held together by means of a slit protecting sleeve, this mechanism allowing the sleeve to be kept stationary during both wrapping operations as explained below.

Figure 8:
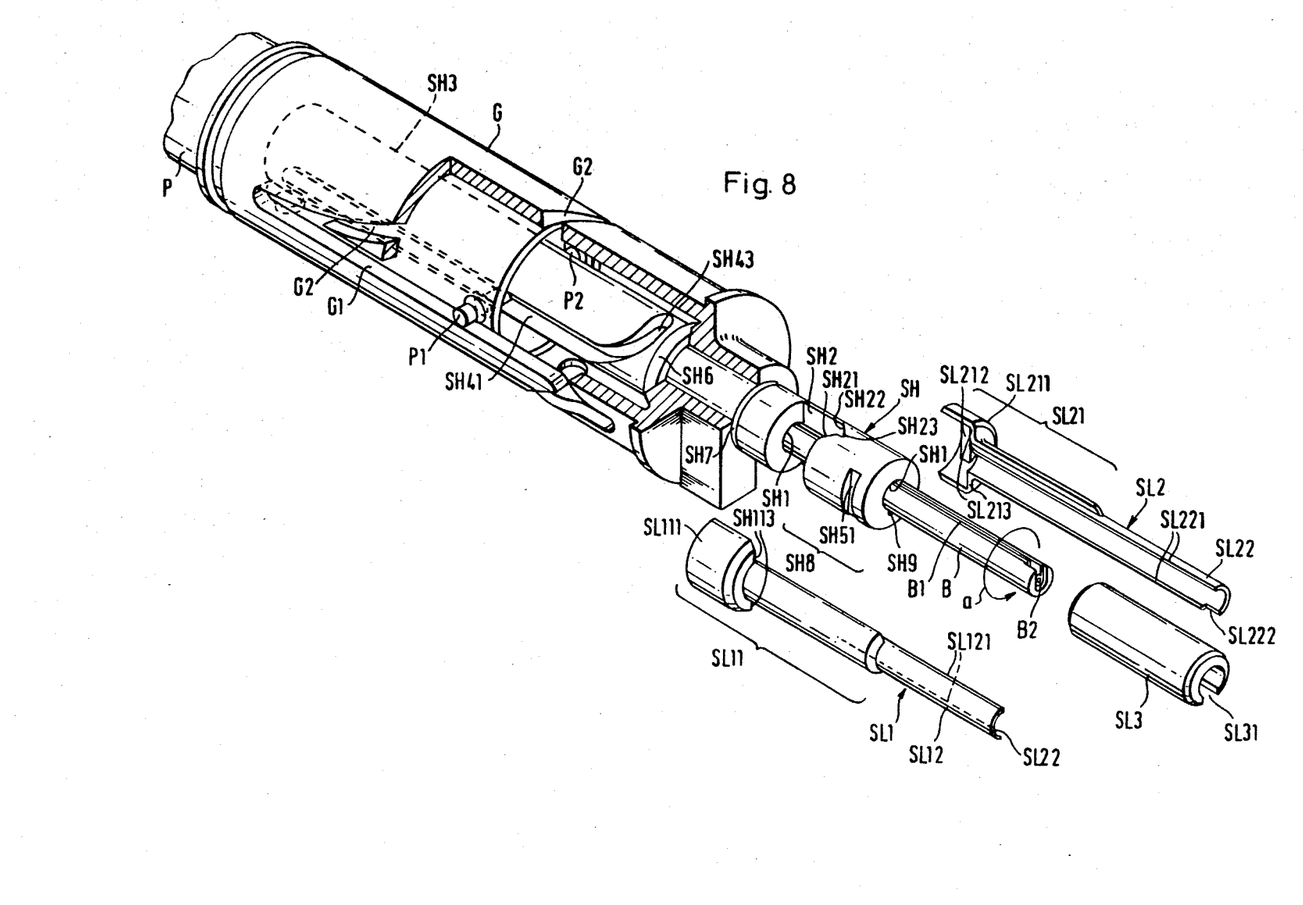
FIG. 8 shows part of a pneumatic wire cutting, skinning and wrapping tool the operation of which is controlled by the pneumatic control system shown in FIG. 5.

The sleeve mechanism shown in perspective in FIG. 8 mainly includes a sleeve holder SH, two sleeve halves SL1 and SL2 and a protecting sleeve SL3. The guide cylinder G, the double acting piston P and bit B which are very similar to the respective like named elements 13, 01 and 05 of the above mentioned U.S. patent are shown for the sake of ease of understanding of the operation of the sleeve mechanism. The guide cylinder G a part of which has been removed to show more clearly the sleeve mechanism has two straight slits G1 and G'1 and two helical slits G2 and G'2, only G1 and G2 of which are shown partly. The bit B is centrally fixed to the wrapping motor (not shown) which is mounted in the piston P. This piston has two guide pins P1 and P2 the latter of which is shown partly. The sleeve holder SH has a bore SH1 wherein the bit may slide to and fro, a cut-out portion SH2 with oblique edges SH21 and SH22 and knife SH23, a body SH3 with two diametrically opposite longitudinal slits SH41 and SH42 only one of which (SH41) is shown, two diametrically opposite slots SH51 and SH52 one of which (SH51) is shown, a collar SH6 and an annular groove SH7. Both longitudinal slits SH41 and SH42 end into oblique end portions SH43 and SH44 (only SH43 shown) which are at an angle with respect to the straight slit portions. The terminal part SH8 of the sleeve holder SH has a longitudinal inner groove SH9. The sleeve holder SH is rotatably mounted in the guide cylinder G and the collar SH6 and an annular ring mounted into the annular groove SH7 prevents an axial displacement of the sleeve holder. The two symmetric sleeve halves SL1 and SL2 are both constituted by end portions SL11 and SL21 molded onto tube halves SL12 and SL22, respectively. These tube halves SL12 and SL22 are provided with cut-out portions SL122 and SL222, respectively. End portions SL11 and SL21 are provided with respective knots SL111 and SL211 with projection SL112 and SL212 only the last one of which is shown. The end portion surfaces SL113 and SL213 do not coincide with the edges SL121 and SL221 of the tube halves SL12 and SL22, respectively, such that when the two sleeve halves SL1 and SL2 are assembled together back to back over the sleeve holder terminal part SH8, these surfaces SL113 and SL213 define longitudinal slits, the purpose of which will be explained later. The two sleeve halves are assembled in such a way that the knots SL111 and SL211 envelop the sleeve holder terminal part SH8, the projections SL112 and SL212 fitting in the slots SH51 and SH52, respectively. Finally, in order to hold the assembled sleeve halves SL1 and SL2 together the protecting sleeve SL3 provided with a longitudinal slit SL31 is slid over the sleeve halves with this slit SL31 coinciding with the groove SH9 in the terminal part SH8.

During the forward movement of the double acting piston P and bit B rigidly fixed to the wrapping motor centrally mounted in the piston, guide pins P1 and P2 of piston P are engaged in both longitudinal slits SH41 and SH42 of sleeve holder SH and in the straight slits G1 and G1' of guide cylinder G, respectively.

This guide cylinder G is fixed to the body of the wire cutting, skinning and wrapping tool. Consequently, as long as the guide pins P1 and P2 are engaged in the straight longitudinal slits SH41 and SH42, respectively, the sleeve holder remains stationary but as soon as the guide pins P1 and P2 arrive in the oblique end portions SH43 and SH44 of sheets holder SH the sleeve holder starts rotating in the direction of the arrow a and continues to rotate until the piston P and bit B have arrived at the end of their stroke in forward direction, the sleeve holder SH having rotated over an angle of 90° in oblique end portions SH43 and SH44. The reason of this 90° rotation will become clear from the description of the four operation sequences explained later. During the time interval of the backward movement of the double acting piston P when the piston pins P1 and P2 are engaged in the oblique end portions SH43 and SH44 and the helical slits G2' and G2 the sleeve holder SH rotates in a direction opposite to that of arrow a over an angle smaller than 90° since during the above time interval the piston pins P1 and P2 move in the substantially straight portions of the helical slits G2' and G2. During the further backward movement of the piston P and bit B when the piston pins P1 and P2 are engaged in the helical slits G2 and G2' of the guide cylinder G and the longitudinal slits SH41 and SH42 of the sleeve holder SH both the sleeve holder SH and the bit B rotate in the direction of the arrow a so that when the piston P is at the end of its stroke in backward direction both sleeve holder SH and bit B have rotated in the direction of the arrow over an angle of 180° from the starting position shown in FIG. 8. From the above it follows that during each wrapping operation when the bit is in its extreme forward position the sleeve mechanism will remain fixed with respect to the tool body, as distinct from the tool described in the above U.S. patent wherein the sleeve has to be rotated during the second wrapping operation.

FIGS. 9 to 16 show the operation sequences which are able to be carried out by means of the above cutting, skinning and wrapping tool. In these figures the sleeve mechanism, the bit and guide cylinder are only partly represented. At the start of each operations sequence the trigger T of the pneumatic control circuit is pulled.

Figures 9, 10, 11, 12:
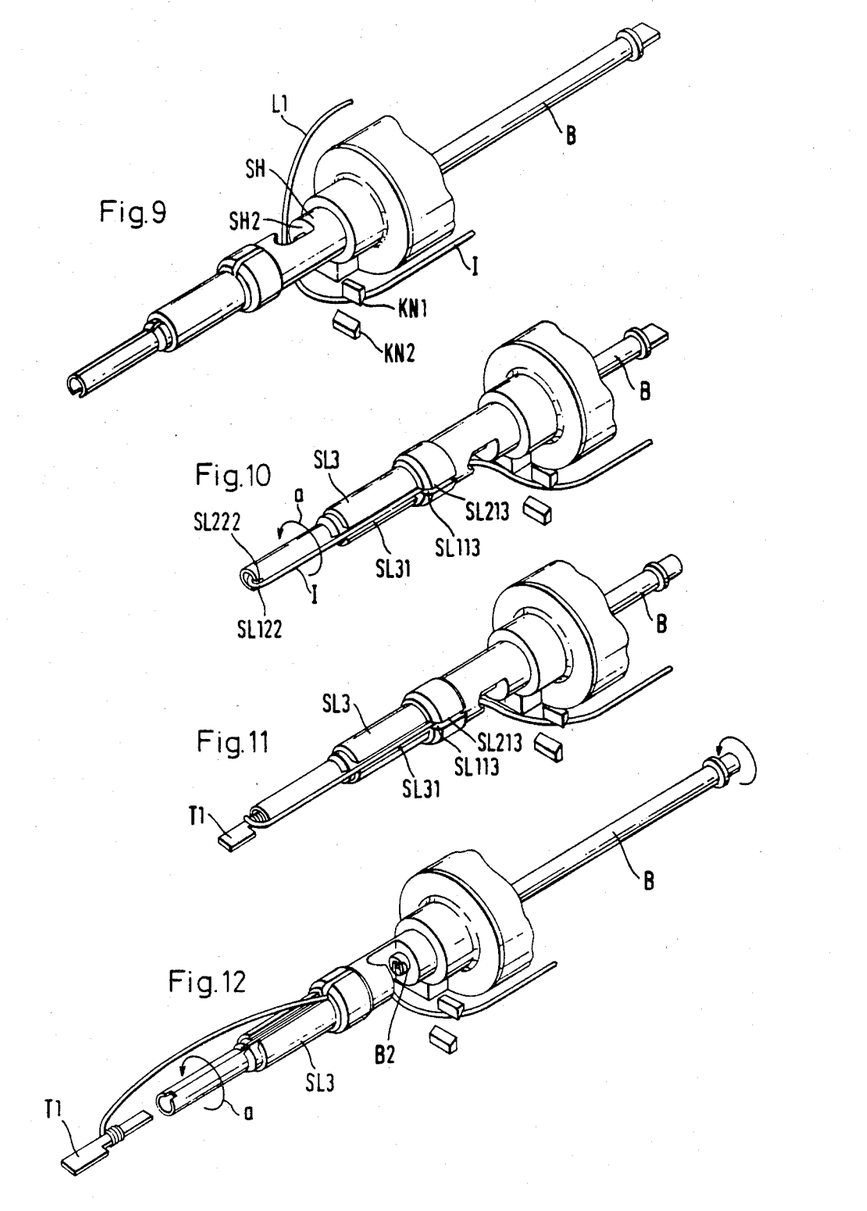
FIGS. 9 to 16 show four operation sequences of the wire cutting, skinning and wrapping tool partially shown in FIG. 8.

1st Operation Sequence (FIGS. 9 and 10)

In a way similar to that described in the above mentioned U.S. patent an insulated wire is fed through the cut-out portion SH2 of the sleeve holder SH (FIG. 9) via the cutting mechanism schematically represented by means of knives KN1 and KN2. During the translational movement in a forward direction of the bit B the insulated wire portion L1 is skinned and the insulated wire I is forced through the groove SH9 (FIG. 8) of the sleeve holder, passes through the slit defined by the end portion surfaces SL113 and SL213 and opens the closed sleeve halves SL1 and SL2. When the piston P (FIG. 8) arrives at the end of its stroke in forward direction the sleeve mechanism is rotated over an angle of 90° in the direction of the arrow a as explained above so that the bit terminal hole B2 visible in FIG. 8 is disengaged. At the extreme forward position of the bit the sleeve halves close again and the insulated wire I (FIGS. 9 and 10) which is fed from the reel is now partly situated outside the closed sleeve and passes via the longitudinal groove SH9, the slit defined by end portion surfaces SL113 and SL213, the longitudinal slit SL31 of the protecting sleeve SL3 and cut-out portions SL122, SL222.

2nd Operation Sequence (FIGS. 11 and 12)

Prior to the first wrapping operation, the terminal T1 to be wrapped is inserted in the bit terminal hole B2 visible in FIG. 12. When the first wire wrapping operation has been carried out the bit moves backward rotating over an angle of 180° in the direction of the arrow a (FIG. 12). As explained above the sleeve rotates first in a direction opposite to that of the direction of the arrow a over an angle smaller than 90° and then over an angle smaller than 180° in the direction of the arrow so that finally the position of the sleeve mechanism represented in FIG. 12 is that shown in FIG. 9 but rotated over 180° in the direction of the arrow a.

Figure 13:
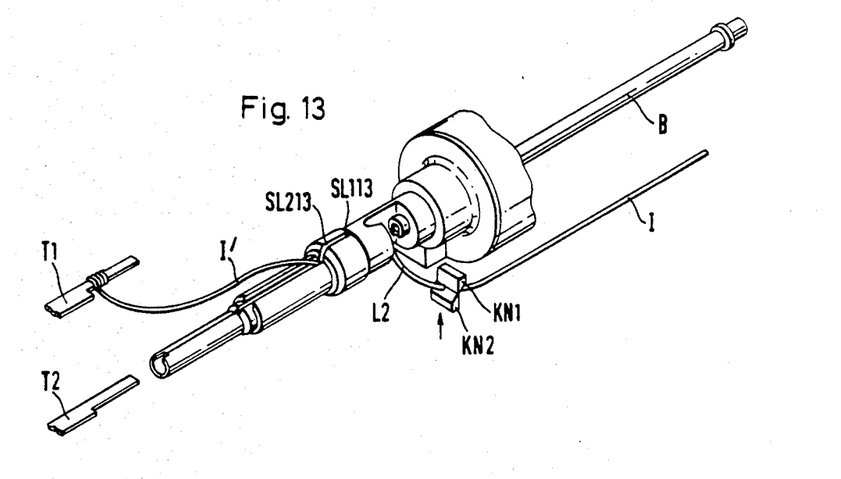
Figure 14:
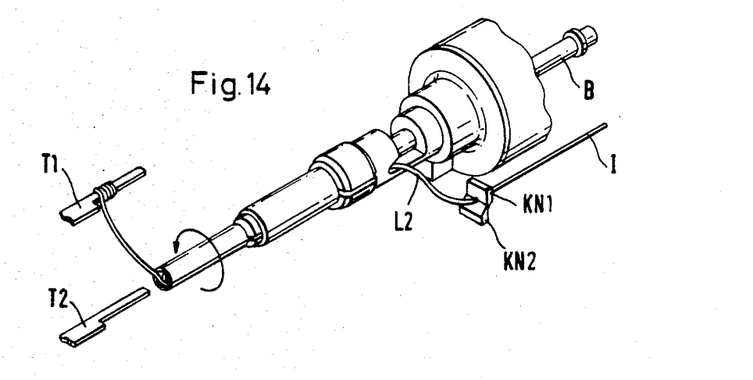

3rd Operation Sequence (FIGS. 13 and 14)

Figure 17:
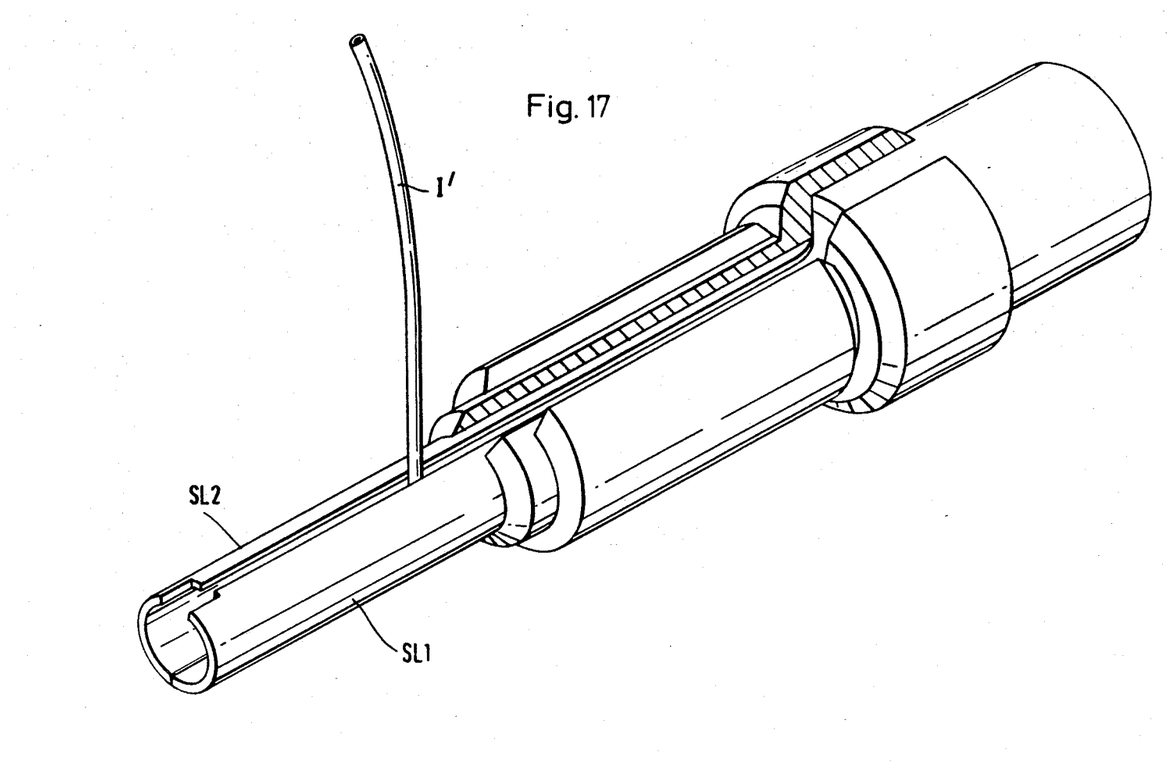
FIG. 17 shows the third operating sequence in more detail.

The tool is moved towards the second terminal T2. During this movement the insulated wire is fed via the groove SH9 of the sleeve holder and the slit defined by the end portion surfaces SL113 and SL213. When the trigger is pulled the insulated wire is cut (FIG. 13) by means of a cutting mechanism schematically represented by KN1 and KN2 as mentioned earlier and the bit moves in forward direction to skin the cut wire end portion L2. Similarly and as explained in the first operation sequence the insulated wire I' opens the sleeve halves SL1 and SL2 as shown in FIG. 17. Again, when the piston P arrives at the end of its stroke in the forward direction the sleeve mechanism is rotated over an angle of 90° in the direction of the arrow and the sleeve halves close again (FIG. 14).

Figure 15:
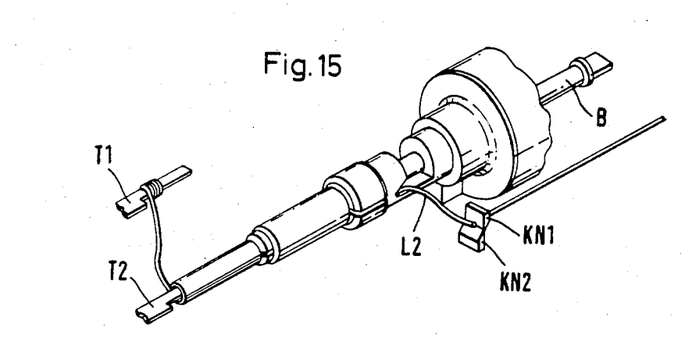
Figure 16:
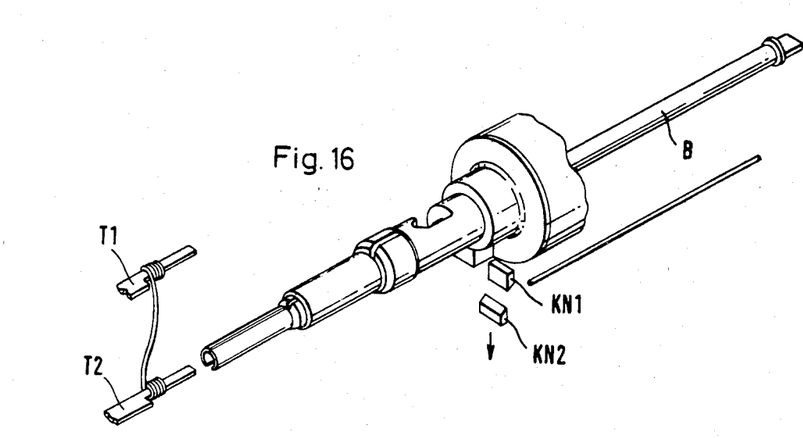

4th Operation Sequence (FIGS. 15 and 16)

When the second wrapping operation has been carried out the bit moves backward, the bit and sleeve mechanism rotating again in the direction of the arrow as explained above so that this mechanism and the bit are again in their starting position when the piston P is at the end of its strokes in the backward direction.

While we have described above the principles of our invention in connection with specific apparatus it is to be clearly understood that this description is made only by way of example and not as a limitation to the scope of our invention as set forth in the objects thereof and in the accompanying claims.

We claim:

1. A wire cutting, skinning and wrapping tool capable of performing two successive skinning and wrapping operations in order to interconnect two terminals with an insulated wire comprising:
   a hollow sleeve;
   a knife carried by said sleeve; and
   a bit provided with a longitudinal groove which is able to slide in a forward and backward direction in said sleeve, said bit and said knife skinning said wire over a predetermined length;
   means associated with said bit to move said bit from a backward position to a forward position during said skinning operation, the skinned wire portion being situated in said longitudinal groove during said two skinning operations;
   said sleeve being provided by normally closed sleeve halves, said insulated wire opening said sleeve halves longitudinally during said skinning operations and that said sleeve halves close again when said bit is in its forward position after each skinning operation, said predetermined skinned wire length being captured in said groove between said bit and said closed sleeve halves.

2. A tool according to claim 1, wherein
   said sleeve includes
   two sleeve halves mounted together back to back on an extremity of a sleeve holder having diametrically opposite slots,
   each of said sleeve halves being provided with a knot each having a projection fitting into said diametrically opposite slots,
   said sleeve halves being held together by means of a protecting sleeve which is slid over said sleeve halves when assembled.

3. A tool according to claim 2, wherein
   each of said sleeve halves include
   a tube half molded on an end portion which is integral with an associated one of said knots.

4. A tool according to claim 2, wherein
   said means to move said bit includes
   a guide cylinder, and
   a double acting piston disposed in said guide cylinder, said piston having a motor with said bit centrally mounted thereon,
   said piston being provided with oppositely fixed piston pins and being able to reciprocate in a cylindrical housing of said tool,
   said guide cylinder being fixedly mounted in said housing and having oppositely located straight slits and oppositely located helical slits having the same pitch and extending between said straight slits,
   said sleeve holder being provided with two oppositely located slits, and
   each of said piston pins being simultaneously engaged in one of said slits of said sleeve holder and one of said straight and helical slits of said guide cylinder during said forward and backward movement of said bit.

5. A tool according to claim 4, wherein
   said bit includes
   a terminal hole wherein a terminal to be wrapped is located,
   a major portion of said sleeve holder slits are straight and ends in a curved portion situated adjacent said extremity so that said sleeve rotates over a predetermined angle when said bit approaches said forward position, said insulated wire thus disengages said terminal hole after both of said skinning operations.

* * * * *